(12) United States Patent
Haneda (10) Patent No.: US 10,778,095 B2
(45) Date of Patent: Sep. 15, 2020

(54) SWITCHING DC/DC CONVERTER HAVING POWER OUTPUT DURING ON AND OFF PERIODS

(71) Applicant: NTN CORPORATION, Osaka-shi, Osaka (JP)

(72) Inventor: Masaji Haneda, Shiga (JP)

(73) Assignee: NTN CORPORATION, Osaka-shi, Osaka (JP)

(*) Notice: Subject to any disclaimer, the term of this patent is extended or adjusted under 35 U.S.C. 154(b) by 0 days.

(21) Appl. No.: 16/308,801

(22) PCT Filed: May 9, 2017

(86) PCT No.: PCT/JP2017/017467
§ 371 (c)(1),
(2) Date: Dec. 10, 2018

(87) PCT Pub. No.: WO2017/212843
PCT Pub. Date: Dec. 14, 2017

(65) Prior Publication Data
US 2019/0149042 A1    May 16, 2019

(30) Foreign Application Priority Data
Jun. 10, 2016   (JP) ................................ 2016-116038

(51) Int. Cl.
*H02M 3/335* (2006.01)
*H02M 3/156* (2006.01)
(Continued)

(52) U.S. Cl.
CPC .............. *H02M 3/156* (2013.01); *H01F 3/14* (2013.01); *H02M 3/33538* (2013.01); *H02M 1/40* (2013.01); *H02M 3/3353* (2013.01)

(58) Field of Classification Search
CPC ......... H02M 3/156; H02M 2001/4283; H02M 2001/4291; H02M 3/1584; H02M 3/285;
(Continued)

(56) References Cited

U.S. PATENT DOCUMENTS 4,385,263 A * 5/1983 Luz ........................ H04N 3/185
315/208
4,774,649 A * 9/1988 Archer .............. H02M 3/33538
363/20
(Continued)

FOREIGN PATENT DOCUMENTS

JP    S6113207 A    6/1986
JP    H10731150 A   1/1995
(Continued)

OTHER PUBLICATIONS

Japan Patent Office, International Search Report and Written Opinion of the International Searching Authority, dated Jul. 11, 2017, in PCT/JP2017/017467, which is the international application to this U.S. application.
(Continued)

*Primary Examiner* — Jue Zhang
*Assistant Examiner* — David A. Singh
(74) *Attorney, Agent, or Firm* — Kolitch Romano LLP (57) ABSTRACT

A DC/DC converter is described that can output power during both an on-period and an off-period of a switching element. The DC/DC converter may have a transformer and a switching element that may be turned on and off to connect or cut off the primary coil of the transformer. A first rectification device connected between the secondary coil of the transformer and an output terminal makes a first current on a path from the input terminal to the output terminal via the secondary coil to flow during an on-period, and cuts off the first current during an off-period. A second rectification
(Continued)

device connected between the primary coil and the output terminal cuts off a second current on a path from the input terminal to the output terminal via the primary coil during the on-period, and makes the second current to flow during the off-period.

10 Claims, 5 Drawing Sheets

(51) Int. Cl.
*H01F 3/14* (2006.01)
*H02M 1/40* (2007.01)
(58) Field of Classification Search
CPC ............ H02M 3/3353; H02M 3/33538; H01F 27/306; G05F 1/33; G05F 1/38; G05F 1/70; H02J 3/38; H02J 3/46
USPC .......................... 323/207, 222; 363/65, 89, 90
See application file for complete search history.

(56) References Cited

U.S. PATENT DOCUMENTS

| | | | |
|---|---|---|---|
| 5,506,766 A | | 9/1996 | Takahashi |
| 5,619,400 A | | 4/1997 | Bowman et al. |
| 7,193,866 B1 * | | 3/2007 | Huang .............. H02M 3/33592 363/22 |
| 2006/0209571 A1 | | 9/2006 | Aso et al. |
| 2007/0114979 A1 * | | 5/2007 | Chandrasekaran . H02M 3/1588 323/222 |
| 2008/0054874 A1 * | | 3/2008 | Chandrasekaran ..... H01F 37/00 323/362 |
| 2008/0297126 A1 * | | 12/2008 | Nagano ................ H01F 27/385 323/271 |
| 2009/0128277 A1 * | | 5/2009 | Moiseev ................ H01F 30/06 336/170 |
| 2010/0133905 A1 * | | 6/2010 | Chang ...................... H02J 1/08 307/31 |
| 2011/0000900 A1 * | | 1/2011 | Luo ..................... B23K 9/1043 219/130.1 |
| 2014/0016368 A1 * | | 1/2014 | Chandrasekaran ... H02M 3/156 363/21.12 |
| 2015/0162823 A1 | | 6/2015 | Partridge |
| 2016/0069938 A1 | | 3/2016 | Wu et al. |
| 2016/0248340 A1 * | | 8/2016 | Deboy .................. H02M 7/217 |
| 2017/0048937 A1 * | | 2/2017 | Wang ..................... H01F 38/14 |
| 2017/0187215 A1 | | 6/2017 | Noda |

FOREIGN PATENT DOCUMENTS

| | | |
|---|---|---|
| JP | H07222443 A | 8/1995 |
| JP | H108331860 A | 12/1996 |
| JP | H11141938 A | 2/1999 |
| JP | 2002010632 A | 1/2002 |
| JP | 2003017136 A | 1/2003 |
| JP | 2003199344 A | 7/2003 |
| JP | 2005218224 A | 8/2005 |
| JP | 2007037297 A | 2/2007 |
| JP | 2007097297 A | 4/2007 |
| JP | 2008113537 A | 5/2008 |
| JP | 2011147325 A | 7/2011 |
| JP | 2012124977 A | 6/2012 |
| JP | 2013090491 A | 5/2013 |
| JP | 2013128379 A | 6/2013 |
| JP | 2013158168 A | 8/2013 |
| JP | 2013163418 A | 8/2013 |
| JP | 2014023286 A | 2/2014 |
| JP | 2014110680 A | 6/2014 |
| JP | 2016039742 A | 3/2016 |
| WO | 2014141371 A1 | 9/2014 |

OTHER PUBLICATIONS

Japan Patent Office, International Search Report and Written Opinion of the International Searching Authority, dated May 16, 2017, in PCT/JP2017/011363, which is a related international application of Applicant NTN Corporation.
Japan Patent Office, International Search Report and Written Opinion of the International Searching Authority, dated Jun. 6, 2017, in PCT/JP2017/017469, which is a related international application of Applicant NTN Corporation.
U.S. Patent and Trademark Office, Office Action in U.S. Appl. No. 16/308,395 dated May 16, 2019, which is a co-pending application of Applicant NTN Corporation.

* cited by examiner

(a) ON-PERIOD (b) OFF-PERIOD

(a) ON-PERIOD (b) OFF-PERIOD

SWITCHING DC/DC CONVERTER HAVING POWER OUTPUT DURING ON AND OFF PERIODS

FIELD

The present disclosure relates to a switching DC/DC converter, and more particularly relates to a forward DC/DC converter and a flyback DC/DC converter.

INTRODUCTION

There is known a DC/DC converter that turns on and off direct-current power input to a primary coil of a transformer by way of a switching element so as to obtain a desired level of direct-current power from a secondary coil. A forward mode and a flyback mode are also known as the modes of DC/DC converters.

In the forward mode, an excitation current flows through a primary coil during an on-period of a switching element, and a load current is caused to flow through a secondary coil by mutual induction in accordance with a turn ratio. A load current also flows through the primary coil correspondingly. The load current flowing through the secondary coil is output via an output diode and an external choke coil, and also excites the external choke coil to cause accumulation of magnetic energy. During an off-period of the switching element, a load current flows to an output via a freewheel diode in such a manner that the magnetic energy accumulated in the external choke coil is discharged.

In the flyback mode, an excitation current flows through a primary coil during an on-period of a switching element, thereby accumulating magnetic energy in a transformer. No current flows through a secondary coil because an output diode is reverse-biased. During an off-period of the switching element, a back electromotive force that makes the output diode forward-biased is generated in the secondary coil. Also, a load current flows through the secondary coil in such a manner that the magnetic energy accumulated in a core is discharged, and is output via the output diode. The configuration in the flyback mode is simpler than that in the forward mode.

For example, Patent Literatures 1 and 2 are presented as a configuration of a switching DC/DC converter in which direct-current power is output during both an on-period and an off-period. A loose-coupling transformer is used in Patent Literature 1. During an on-period, a forward current by mutual induction between a primary coil and a secondary coil is output, and imbalance of magnetic fluxes (magnetic energy) accumulated in the primary coil and the second coil is caused. During an off-period, a short-circuit current is caused to flow through the primary coil, so that reduction of the magnetic fluxes in the primary coil is suppressed and increase of the magnetic fluxes in the secondary coil is maintained. In this manner, it is possible to output a forward current by mutual induction from the secondary coil also during the off-period.

In Patent Literature 2, a loose-coupling transformer is used to enable output of a forward current during an on-period and output of a flyback current during an off-period.

CITATION LIST

Patent Literatures

Patent Literature 1: Japanese Patent Application Laid-open No. 2007-97297

Patent Literature 2: Japanese Patent Application Laid-open No. 2013-90491

SUMMARY

Technical Problem

Although higher power can be output in the forward mode as compared to the flyback mode, the forward mode requires an external choke coil and a freewheel diode, and therefore the number of components is larger and the components occupy a larger space.

The flyback mode cannot output power during an on-period of a switching element. Further, a flyback transformer has a gap provided in a core to accumulate magnetic energy without causing magnetic saturation of the core. The gap reduces the inductance and thus it is difficult to obtain a large current. Accordingly, the flyback mode is used for smaller power applications than the forward mode.

Further, the mode in Patent Literature 1 is one type of the forward mode that does not require an external choke coil. However, the current during an off-period is a current generated by remaining mutual induction, and thus it is difficult to obtain a large current. The mode in Patent Literature 2 has a problem of a large number of components.

In view of the above problems, an object of the present disclosure is to provide a switching DC/DC converter that can output power during both an on-period and an off-period of a switching element with a simple and compact configuration.

Solution to Problem

In order to achieve the above object, the present disclosure provides the following configuration. The reference signs in respective parentheses are reference signs in the drawings, and are denoted for reference purposes.

An aspect of the present disclosure is to provide a DC/DC converter that converts direct-current power between first and second input terminals (T1, T2) and first and second output terminals (T3, T4), where the second input terminal (T2) and the second output terminal (T4) are common terminals, the DC/DC converter comprising:

(a) a transformer (TR) including a primary coil (L1) that is connected at one end to the first input terminal (T1) and a secondary coil (L2) that is magnetically coupled to the primary coil (L1) and is connected at the other end to the first input terminal (T1);

(b) a switching element (Q) that is turned on and off to make a current path between the other end of the primary coil (L1) and the common terminals (T2, T4) conductive or to cut off the current path, and includes a control terminal;

(c) a first rectification device (D1) that is connected between one end of the secondary coil (L2) and the first output terminal (T3), is forward-biased with respect to a potential generated at the one end of the secondary coil (L2) by mutual induction caused by self-induction of the primary coil (L1) when the switching element (Q) is on, and is reverse-biased when the switching element (Q) is off; and (d) a second rectification device (D2) that is connected between the other end of the primary coil (L1) and the first output terminal (T3), is reverse-biased with respect to a potential generated at the other end of the primary coil (L1) by self-induction of the primary coil (L1) when the switching element (Q) is on, and is forward-biased when the switching element (Q) is off.

According to the above aspect, it is preferable that magnetic coupling between the first coil (L1) and the second coil (L2) is loose-coupling.

According to the above aspect, it is preferable that each of the first rectification device (D1) and the second rectification device (D2) is a diode.

According to the above aspect, it is preferable that the primary coil (L1) and the secondary coil (L2) are away from each other and are wound around a core of the transformer (TR).

According to the above aspect, it is preferable that the transformer has a gap.

Another aspect of the present disclosure is to provide a DC/DC converter that converts direct-current power between first and second input terminals (T1, T2) and first and second output terminals (T3, T4), the DC/DC converter comprising:

(a) a transformer (TR) including a primary coil (L1) that is connected at one end to the first input terminal (T1), a first secondary coil (L21) that is magnetically coupled to the primary coil (L1) and is connected at the other end to the second output terminal (T4), and a second secondary coil (L22) that is magnetically coupled to the primary coil (L1) and is connected at one end to the second output terminal (T4);

(b) a switching element (Q) that is turned on and off to make a current path between the other end of the primary coil (L1) and the second input terminal (T2) conductive or to cut off the current path, and includes a control terminal;

(c) a first rectification device (D1) that is connected between one end of the first secondary coil (L21) and the first output terminal (T3), is forward-biased with respect to a potential generated at the one end of the first secondary coil (L21) by mutual induction caused by self-induction of the primary coil (L1) when the switching element (Q) is on, and is reverse-biased when the switching element (Q) is off; and (d) a second rectification device (D2) that is connected between the other end of the second secondary coil (L22) and the first output terminal (T3), is reverse-biased with respect to a potential generated at the other end of the second secondary coil (L22) by mutual induction caused by self-induction of the primary coil (L1) when the switching element (Q) is on, and is forward-biased when the switching element (Q) is off.

According to the above aspect, it is preferable that magnetic coupling between the primary coil (L1) and the first secondary coil (L21) is loose-coupling, and magnetic coupling between the primary coil (L1) and the second secondary coil (22) is tight-coupling.

According to the above aspect, it is preferable that each of the first rectification device (D1) and the second rectification device (D2) is a diode.

According to the above aspect, it is preferable that the primary coil (L1) and the first secondary coil (L21) are away from each other and are wound around a core of the transformer (TR), and the primary coil (L1) and the second secondary coil (L22) are wound around the core of the transformer (TR) in lap winding.

According to the above aspect, it is preferable that the transformer (TR) has a gap.

Advantageous Effects

The present disclosure enables output of a forward current from a secondary coil by mutual induction with a primary coil during an on-period and output of a flyback current from a primary coil or a second secondary coil during an off-period in a switching DC/DC converter. Therefore, power can be output during both an on-period and an off-period, and thus it is possible to output higher power than that in a conventional flyback mode.

Further, an external choke coil that outputs a current during an off-period used in a conventional flyback mode is not necessary.

Loose-coupling between the primary coil and the secondary coil can avoid an inrush current, so that it is possible to prevent a switching element and a load from being damaged.

DETAILED DESCRIPTION

Embodiments of a DC/DC converter according to the present disclosure will be described below in detail with reference to the accompanying drawings.

A DC/DC converter according to the present disclosure converts direct-current power between a pair of input terminals and a pair of output terminals. Direct-current power is supplied between the pair of input terminals. The direct-current power to be supplied can be output of another arbitrary direct-current power supply or output of an alternating-current power supply after being rectified. A load is connected to the pair of output terminals (not shown in the drawings).

The DC/DC converter according to the present disclosure can be configured by either of a step-up type and a step-down type. The following descriptions explain an embodiment of a non-insulated type in which an input side and an output side are not insulated from each other and an embodiment of an insulated type in which an input side and an output side are insulated from each other. In the following descriptions, "forward mode" and "flyback mode" are used to refer to a known principle circuit in the respective modes.

(1) First Embodiment (Non-Insulated DC/DC Converter)

(1-1) Configuration of Non-Insulated DC/DC Converter

Figure 1:
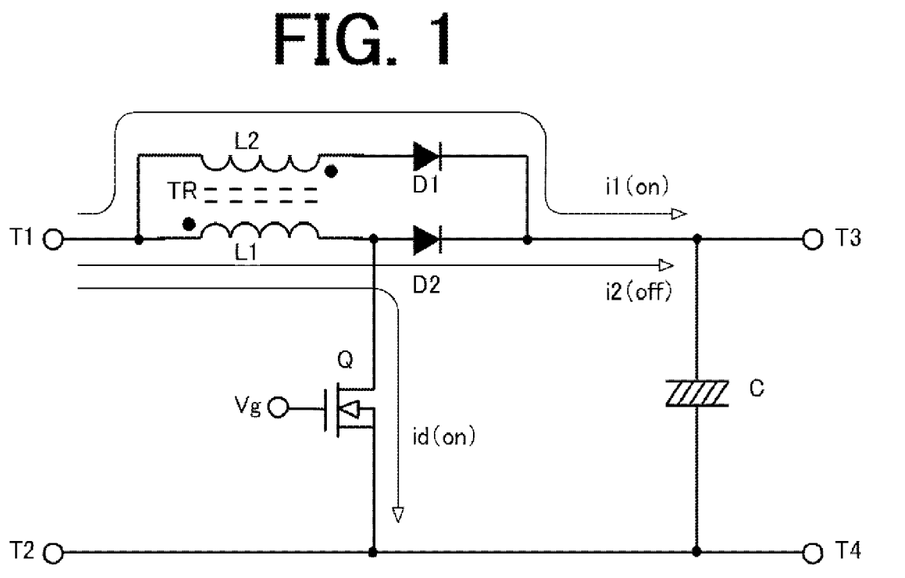
FIG. 1 is a circuit diagram showing a basic configuration example of a first embodiment of the present disclosure.

FIG. 1 is a circuit diagram showing a basic configuration example of a DC/DC converter according to a first embodiment of the present disclosure.

In this circuit, direct-current power is supplied between an input terminal T1 and an input terminal T2. That is, a direct-current voltage is applied. Also, direct-current power is output between an output terminal T3 and an output terminal T4. The first embodiment is a non-insulated type. The input terminal T2 and the output terminal T4 are connected to each other and serve as common terminals which are usually grounded. The following descriptions explain a case in which the common terminals are at a ground potential and the input terminal T1 and the output terminal T3 are used as an input terminal and an output terminal of a positive potential. However, the terminals T1 and T3 can be used as an input terminal and an output terminal of a negative potential.

This circuit includes a transformer TR that has a primary coil L1 and a secondary coil L2. A winding-start terminal of each coil is shown with a black dot (the black dot represents the polarity of the coil). "One end" and "the other end" of a coil in this specification refer to "winding-start terminal" and "winding-end terminal", respectively, in one case, and also refer to "winding-end terminal" and "winding-start terminal", respectively, in another case (same holds true in other embodiments). Further, "one end" and "the other end" can be referred to as "first end" and "second end", respectively, in the descriptions of each coil in this specification.

It is preferable that the primary coil L1 and the secondary coil L2 are loose-coupled to each other. "Loose-coupling" refers to a configuration in which a coupling coefficient of magnetic coupling between two coils wound around a transformer is not 1, and a portion of magnetic fluxes exiting from the primary coil L1 is caused to leak, instead of allowing all magnetic fluxes to pass through the secondary coil L2. Therefore, a ratio of voltages caused by mutual induction is not determined by a turn ratio only. However, this point is a design issue, and is not essential for the present disclosure. In order to achieve loose-coupling between two coils, a gap is provided in a core of a transformer, or the primary coil and the secondary coil are wound to be spaced apart from each other.

One end (a winding-start terminal in this example) of the primary coil L1 and the other end (a winding-end terminal in this example) of the secondary coil L2 are connected to the input terminal T1. The primary coil L1 and the secondary coil L2 are connected to have opposite polarities with respect to the input terminal T1. Therefore, a winding-end terminal of the primary coil L1 and a winding-start terminal of the secondary coil may be connected to the input terminal L1.

A diode D1 is connected between one end (the winding-start terminal in this example) of the secondary coil L2 and the output terminal T3. An anode of the diode D1 is connected to the one end of the secondary coil L2, and a cathode is connected to the output terminal T3.

A diode D2 is connected between the other end (the winding-end terminal in this example) of the primary coil L1 and the output terminal T3. An anode of the diode D2 is connected to the other end of the primary coil L1, and a cathode is connected to the output terminal T3.

Each of the diodes D1 and D2 becomes conductive when a forward-bias voltage is applied, and is cut off when being reverse-biased. It is preferable to use a Schottky barrier diode or a diode for high-speed switching, which has a small forward voltage drop, in order to reduce decrease of a voltage supplied to a load (same holds true in other embodiments). A rectification device, for example, another rectification element and a rectifier circuit, can be used in place of a diode (same holds true in other embodiments).

Further, a drain of a switching element Q that is an N-channel FET is connected to the other end (the winding-end terminal in this example) of the primary coil L1, and a source is connected to the common terminals T2 and T4. A pulse signal is input as a control signal to a gate of the switching element Q which serves as a control terminal thereof. The pulse signal has a predetermined frequency and a predetermined duty ratio. In this example, when the control signal is at a positive potential, the switching element Q is on, so that a current path between the other end of the primary coil L1 and the common terminals T2 and T4 becomes conductive. When the control signal is zero, the switching element is off so that the current path between the other end of the primary coil L1 and the common terminals T2 and T4 is cut off.

As the switching element Q, a P-channel FET can be used in place of an N-channel FET. Also, an IGBT or a bipolar transistor can be used (same holds true in other embodiments).

A smoothing capacitor C is connected between the output terminal T3 and the output terminal T4. Although not shown in the drawings, a load is connected between these output terminals T3 and T4.

FIG. 1 schematically shows a path and a direction of a current flowing in this circuit. A current id and a first current i1 flow during an on-period of the switching element Q, and a current i2 flows during an off-period of the switching element Q.

(1-2) Operation of Non-Insulated DC/DC Converter

Figure 2:
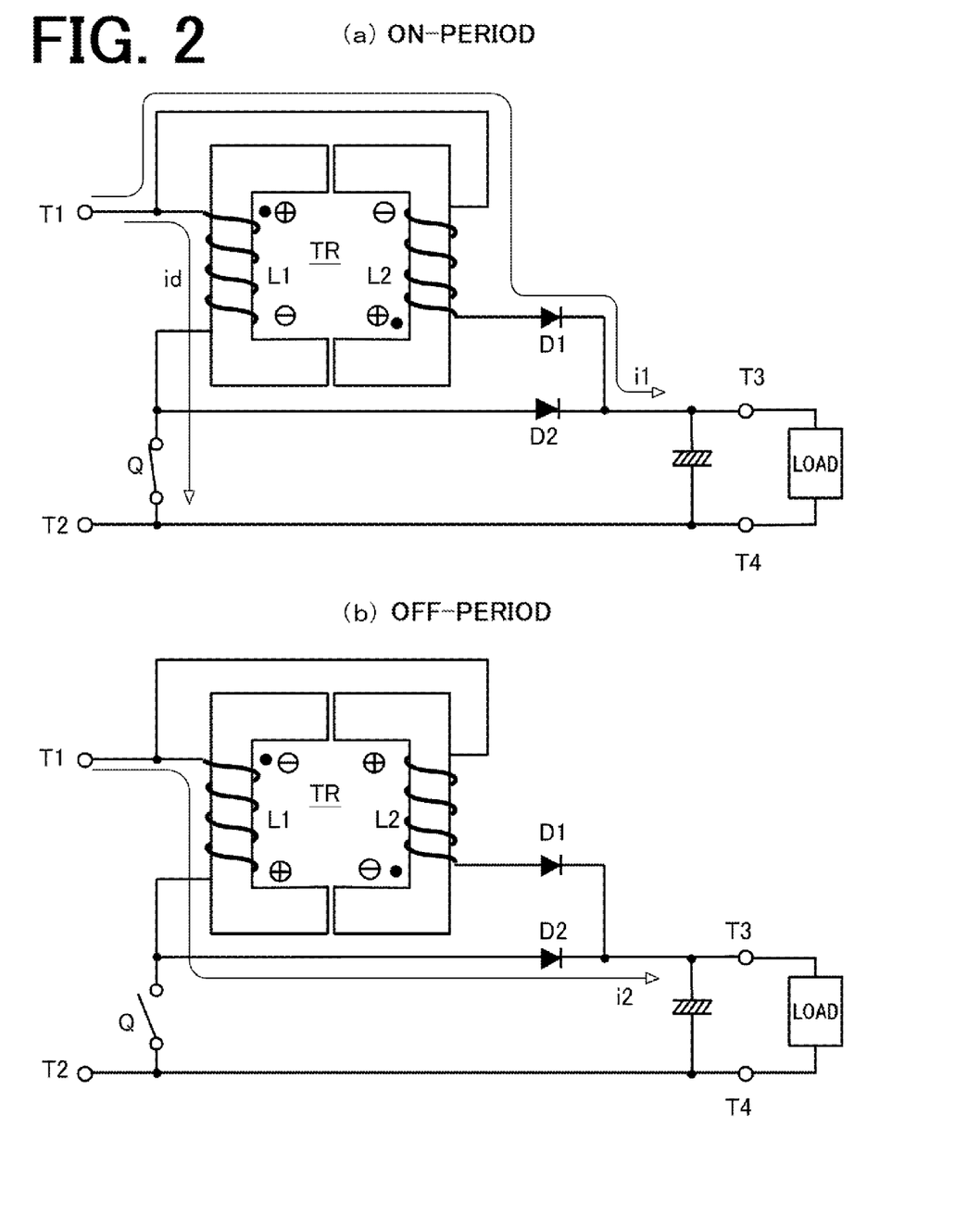
FIGS. 2(a) and 2(b) are schematic diagrams showing, along with a configuration example of a transformer, a current flow during an on-period and an off-period in the circuit shown in FIG. 1.
Figure 3:
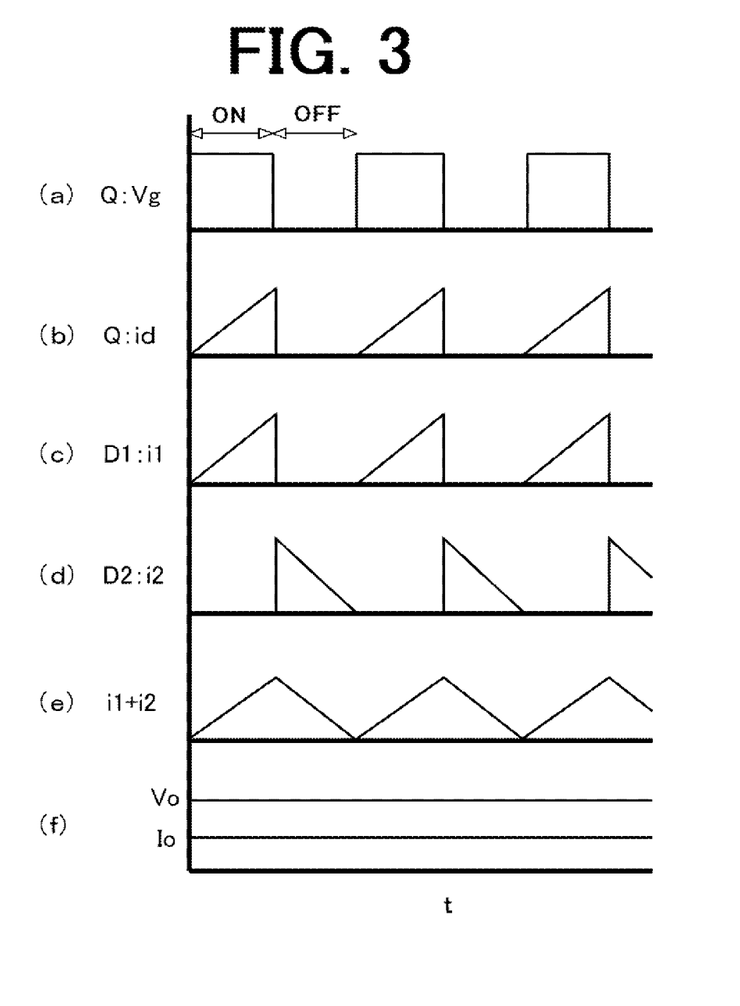
FIG. 3 is a schematic diagram showing an example of temporal change of currents and voltages in the circuit shown in FIG. 1.

FIGS. 2(a) and 2(b) are schematic diagrams showing, along with a configuration example of the transformer TR, a current flow during an on-period and an off-period in the circuit diagram shown in FIG. 1. FIG. 3 is a schematic diagram showing an example of temporal change of currents and voltages at respective points in the circuit shown in FIG. 1. An operation of the circuit shown in FIG. 1 is described with reference to FIG. 2 and FIG. 3.

<Operation During On-Period>

FIG. 2(a) shows a current path during an on-period. A control signal Vg, which is a pulse voltage input to the gate of the switching element Q, is shown in (a) in FIG. 3, for example. In this example, when the control signal Vg is turned on, a current path in the switching element Q becomes conductive and a direct-current voltage is applied to one end of the primary coil L1, so that the one end of the primary coil L1 is at a positive potential and the other end is at a negative potential. Therefore, the current id flows in the order of the input terminal T1→the primary coil L1→the switching element Q→the input terminal T2. Change of the current id during an on-period is shown in (b) in FIG. 3. During this period, the diode D2 connected to the other end of the primary coil L1 is reverse-biased, and therefore no current flows.

Meanwhile, when a current flows through the primary coil L1, magnetic fluxes passing through the core of the transformer TR and the secondary coil L2 are increased, and a back electromotive force is generated in the secondary coil L2 by mutual induction, so that one end of the secondary coil L2 is placed at a positive potential and the other end is placed at a negative potential. Therefore, the diode D1 becomes forward-biased and conductive, and the first current i1 flows in the order of the input terminal T1→the secondary coil L2→the diode D1→the output terminal T3→a load→the output terminal T4 (the input terminal T2). Change of the first current i1 during an on-period is shown in (c) in FIG. 3. The first current i1 corresponds to a forward current during an on-period in the forward mode.

In this case, the primary coil L1 and the secondary coil L2 is loose-coupled. In the example of the transformer TR shown in the drawings, loose-coupling is achieved by providing the primary coil L1 and the secondary coil L2 away from each other and winding the respective coils around separate legs of a UU-shaped core, and providing two gaps in the core. A UU-shaped core is preferable because it is suitable for a loose-coupling transformer, enables easy insulation between coils, and also enables downsizing of the transformer. However, the shape of the core is not limited thereto.

By loose-coupling the primary coil L1 and the secondary coil L2, an inrush current can be prevented from flowing at the moment when the switching element Q is turned on. Therefore, it is possible to prevent damage of the switching element Q. Further, an intense peak current can be prevented from flowing to the secondary coil L2 at the moment when the switching element Q is turned on. Therefore, it is possible to prevent damage of a load by an inrush current.

The current id flowing through the primary coil L1 includes a load current caused by mutual induction with the secondary coil L2 and an excitation current that accumulates magnetic energy in the transformer TR. During an on-period, magnetic fluxes of the transformer TR are increased by an excitation current, and magnetic energy is accumulated.

<Operation During Off-Period>

FIG. 2(b) shows a current path during an off-period. When the control signal Vg is turned off, a current path in the switching element Q is cut off so that the current id flowing through the primary coil L1 disappears. Therefore, a back electromotive force is generated in each of the primary coil L1 and the secondary coil L2. The back electromotive force generated in the secondary coil L2 makes the diode D1 reverse-biased so the first current i1 becomes zero. Meanwhile, because of the back electromotive force generated in the primary coil L1, the diode D2 becomes forward-biased and conductive. Therefore, a second current i2 flows in the order of the input terminal T1→the primary coil L1→the diode D2→the output terminal T3→a load→the output terminal T4 (the input terminal T2). Change of the second current i2 during an off-period is shown in (d) in FIG. 3. The second current i2 corresponds to a flyback current during an off-period in the flyback mode.

By flow of the second current i2 through the diode D2, magnetic energy accumulated in the transformer TR during an on-period is discharged (to return to the initial state during an on-period).

Further, the flow of the second current i2 through the diode D2 also prevents the switching element Q from being broken by a surge voltage generated in the primary coil L1 at the moment when the switching element Q is turned off. This effect is the same effect as that of a snubber circuit. Therefore, it is possible to omit a snubber circuit that is generally provided in a DC/DC converter.

The primary coil L1 and the secondary coil L2 in the first embodiment respectively correspond to a primary coil and a secondary coil in the forward mode. Also, the primary coil L1 in the first embodiment can be regarded as one coil that serves as both a primary coil and a secondary coil in the flyback mode.

<Current and Voltage at Output Terminal>

The total of the currents i1 and i2 output from the diodes D1 and D2 to the output terminal T3 is shown in (e) in FIG. 3. Although FIG. 3 shows a current in a critical mode, a case of a continuous mode and a case of a discontinuous mode are also included in the scope of the present disclosure.

As shown in (f) in FIG. 3, waveforms of an actual voltage Vo and an actual current Io output to the output terminals T3 and T4 are smoothed by an operation of a smoothing capacitor (ripples are omitted).

Basically, an output voltage is determined by a turn ratio and a coupling coefficient of the primary coil L1 and the secondary coil L2, and an output current is determined by a duty ratio of a control signal for the switching element Q. During operation, it is possible to control the output voltage by controlling the duty ratio of the control signal with negative feedback of the output voltage.

(2) Second Embodiment (Insulated DC/DC Converter)

(2-1) Configuration of Insulated DC/DC Converter

Figure 4:
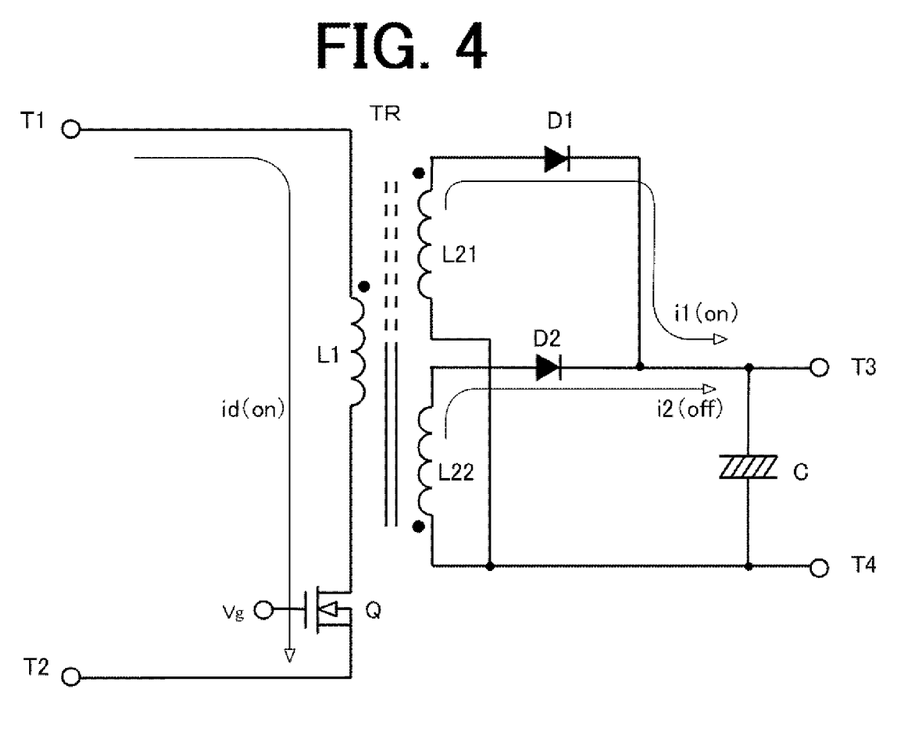
FIG. 4 is a circuit diagram showing a basic configuration example of a second embodiment of the present disclosure.

FIG. 4 is a circuit diagram showing a basic configuration example of a DC/DC converter according to a second embodiment of the present disclosure. The second embodiment is an insulated type in which an input side and an output side are insulated from each other by the transformer TR. On the input side, direct-current power is supplied between the input terminal T1 and the input terminal T2. On the output side, direct-current power is output between the output terminal T3 and the output terminal T4. Following descriptions explain a case in which the input terminal T1 and the output terminal T3 are used as an input terminal and an output terminal of a positive potential and the input terminal T2 and the output terminal T4 are at a ground potential. However, the terminals T1 and T3 can be used as an input terminal and an output terminal of a negative potential.

This circuit includes the transformer TR that has the primary coil L1, a first secondary coil L21, and a second secondary coil L22.

It is preferable that the primary coil L1 and the first secondary coil L21 are loose-coupled to each other. Loose-coupling refers to the same sense as the coupling between the primary coil and the secondary coil in the first embodiment described above.

It is also preferable that the primary coil L1 and the second secondary coil L22 are tight-coupled to each other. In "tight-coupling", a coupling coefficient of magnetic coupling between two coils wound around a transformer is 1. In order to achieve tight-coupling between two coils, the two coils may be wound in lap winding so as not to generate leakage fluxes.

One end (a winding-start terminal in this example) of the primary coil L1 is connected to the input terminal T1. A drain of the switching element Q that is an N-channel FET is connected to the other end (a winding-end terminal in this example) of the primary coil L1. A source of the switching element Q is connected to the input terminal T2. A pulse voltage is input as a control signal to a gate of the switching element Q which serves as a control terminal thereof. The pulse voltage has a predetermined frequency and a predetermined duty ratio. In this case, when the control signal is at a positive potential, the switching element Q is on, so that a current path between the other end of the primary coil L1 and the input terminal T2 becomes conductive. When the control signal is zero, the switching element is off so that the current path between the other end of the primary coil L1 and the input terminal T2 is cut off.

The diode D1 is connected between one end (a winding-start terminal in this example) of the first secondary coil L21 and the output terminal T3. An anode of the diode D1 is connected to the one end of the first secondary coil L21, and a cathode is connected to the output terminal T3. The other end of the first secondary coil L21 is connected to the output terminal T4.

The diode D2 is connected between the other end (a winding-end terminal in this example) of the second secondary coil L22 and the output terminal T3. An anode of the diode D2 is connected to the other end of the second secondary coil L22, and a cathode is connected to the output terminal T3. One end of the second secondary coil L22 is connected to the output terminal T4.

Each of the diodes D1 and D2 becomes conductive when a forward-bias voltage is applied, and is cut off when becoming reverse-biased. The smoothing capacitor C is connected between the output terminal T3 and the output terminal T4. Although not shown in the drawings, a load is connected between these output terminals T3 and T4.

FIG. 4 schematically shows a path and a direction of a current flowing in this circuit. The current id and the first current i1 flow during an on-period of the switching element Q, and the current i2 flows during an off-period of the switching element Q.

(2-2) Operation of Insulated DC/DC Converter

Figure 5:
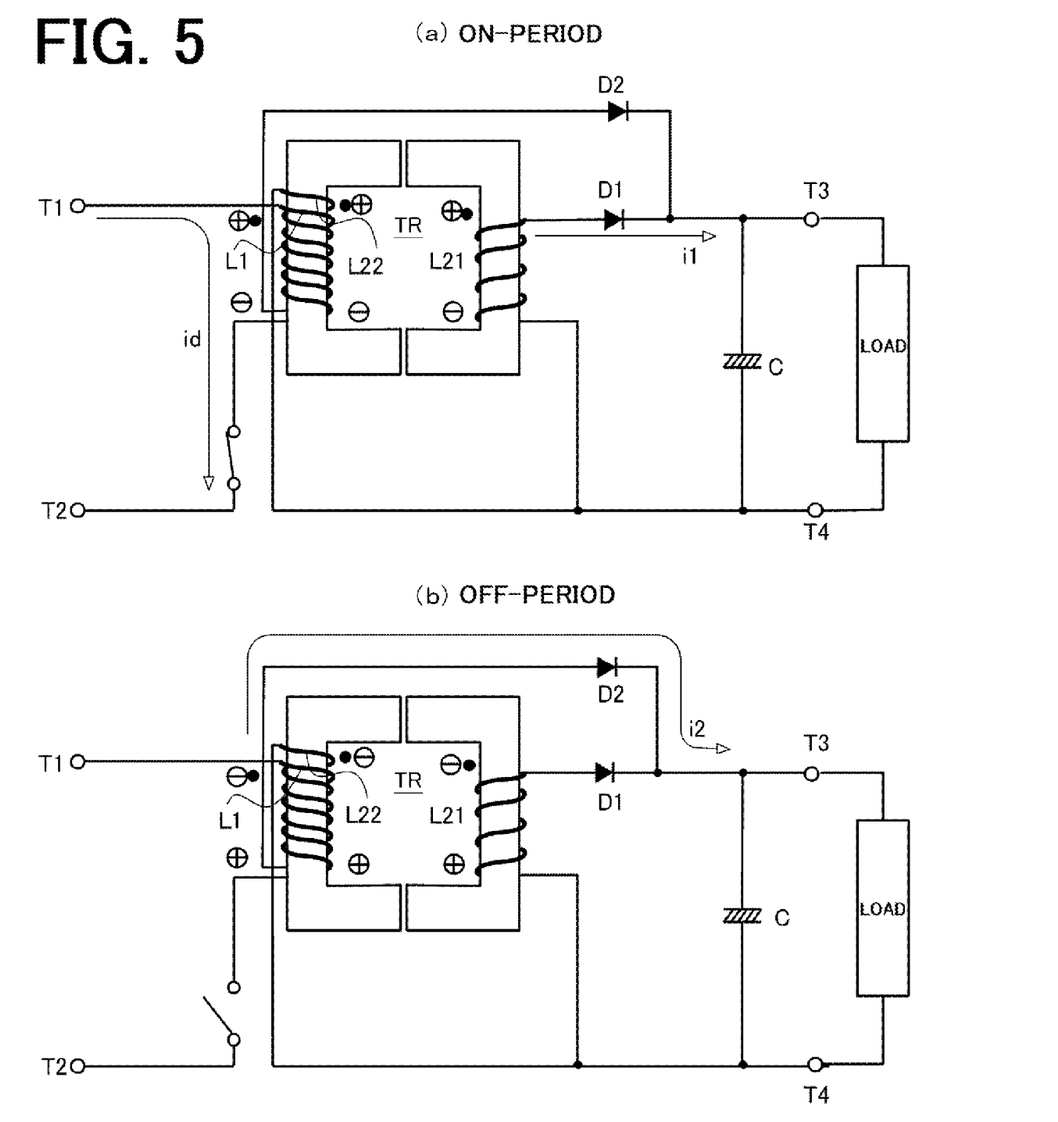
FIGS. 5(a) and 5(b) are schematic diagrams showing, along with a configuration example of a transformer, a current flow during an on-period and an off-period in the circuit diagram shown in FIG. 4.

FIGS. 5(a) and 5(b) are schematic diagrams showing, along with a configuration example of a transformer, a current flow during an on-period and an off-period in the circuit diagram shown in FIG. 4. The waveform charts in FIG. 3 can be also applied to the second embodiment. Therefore, an operation of the circuit in FIG. 4 is described with reference to FIG. 5 and FIG. 3.

<Operation During On-Period>

FIG. 5(a) shows a current path during an on-period. The control signal Vg, which is a pulse voltage input to the gate of the switching element Q, is shown in (a) in FIG. 3, for example. When the control signal Vg is turned on, a current path in the switching element Q becomes conductive and a direct-current voltage is applied to one end of the primary coil L1, so that the one end of the primary coil L1 becomes positive potential and the other end becomes negative potential. Therefore, the current id flows in the order of the input terminal T1→the primary coil L1→the switching element Q→the input terminal T2. Change of the current id during an on-period is shown in (b) in FIG. 3.

When a current flows through the primary coil L1, magnetic fluxes passing through a core of the transformer TR and the first secondary coil L21 are increased, and an electromotive force is generated in the first secondary coil L21 by mutual induction, so that one end of the first secondary coil L21 is placed at a positive potential and the other end is placed at a negative potential. Therefore, the diode D1 becomes forward-biased and conductive, and the first current i1 flows in the order of the first secondary coil L21→the diode D1→the output terminal T3→a load→the output terminal T4 the first secondary coil L21. Change of the first current i1 during an on-period is shown in (c) in FIG. 3. The first current i1 corresponds to a forward current during an on-period in the forward mode.

Meanwhile, the second secondary coil L22 wound on the primary coil L1 in lap winding has a positive potential at one end and a negative potential at the other end. Also, because the diode D2 connected to the other end of the second secondary coil L22 is reverse-biased, no current flows.

Because the primary coil L1 and the first secondary coil L21 are configured in an identical manner to the primary coil and the secondary coil in the first embodiment to achieve loose-coupling, the same effects as those described above can be obtained.

The current id flowing through the primary coil L1 includes a load current caused by mutual induction with the first secondary coil L21 and an excitation current that accumulates magnetic energy in the transformer TR. During an on-period, magnetic fluxes of the transformer TR are increased by an excitation current, and magnetic energy is accumulated.

<Operation During Off-Period>

FIG. 5(b) shows a current path during an off-period. When the control signal Vg is turned off, a current path in the switching element Q is cut off so that the current id flowing through the primary coil L1 disappears. Therefore, a back electromotive force is generated in each of the primary coil L1, the first secondary coil L21, and the second secondary coil L22. A current path of the primary coil L1 is cut off so a current becomes zero.

The back electromotive force generated in the first secondary coil L21 makes the diode D1 reverse-biased so the first current i1 becomes zero. Meanwhile, because of the back electromotive force generated in the second secondary coil L22, the diode D2 becomes forward-biased and conductive. Therefore, the second current i2 flows in the order of the second secondary coil L22 the diode D2→the output terminal T3→a load→the output terminal T4→the second secondary coil L22. Change of the second current i2 during an off-period is shown in (d) FIG. 3. The second current i2 corresponds to a flyback current during an off-period in the flyback mode.

By flow of the second current i2 through the diode D2, magnetic energy accumulated in the transformer TR during an on-period is discharged.

Further, the flow of the second current i2 through the diode D2 prevents the switching element Q from being broken by a surge voltage generated in the primary coil L1 at the moment when the switching element Q is turned off. This effect is the same effect as that of a snubber circuit. Therefore, it is possible to omit a snubber circuit that is generally provided in the flyback mode.

The primary coil L1 and the first secondary coil L21 in the second embodiment respectively correspond to a primary coil and a secondary coil in the forward mode. Also, the primary coil L1 and the second secondary coil L22 in the second embodiment respectively correspond to a primary coil and a secondary coil in the flyback mode. In this case, the forward mode and the flyback mode use the same primary coil.

Waveforms of a current and a voltage at an output terminal, as well as the setting and the control method of an output voltage and an output current are identical to those in the first embodiment.

REFERENCE SIGNS LIST

TR transformer
L1 primary coil
L2, L21, L22 secondary coil
T1, T2 input terminal
T3, T4 output terminal
Q switching element
D1, D2 diode
C smoothing capacitor The series of paragraphs below recites various illustrative combinations of features of the present disclosure. These paragraphs are intended to represent a non-limiting presentation of suitable combinations, and are alphanumerically designated for clarity and efficiency:

A0. A DC/DC converter that converts direct-current power between first and second input terminals (T1, T2) and first and second output terminals (T3, T4), where the second input terminal (T2) and the second output terminal (T4) are common terminals, the DC/DC converter comprising:

(a) a transformer (TR) including a primary coil (L1) that is connected at one end to the first input terminal (T1) and a secondary coil (L2) that is magnetically coupled to the primary coil (L1) and is connected at the other end to the first input terminal (T1);

(b) a switching element (Q) that is turned on and off to make a current path between the other end of the primary coil (L1) and the common terminals (T2, T4) conductive or to cut off the current path, and includes a control terminal;

(c) a first rectification device (D1) that is connected between one end of the secondary coil (L2) and the first output terminal (T3), is forward-biased with respect to a potential generated at the one end of the secondary coil (L2) by mutual induction caused by self-induction of the primary coil (L1) when the switching element (Q) is on, and is reverse-biased when the switching element (Q) is off; and (d) a second rectification device (D2) that is connected between the other end of the primary coil (L1) and the first output terminal (T3), is reverse-biased with respect to a potential generated at the other end of the primary coil (L1) by self-induction of the primary coil (L1) when the switching element (Q) is on, and is forward-biased when the switching element (Q) is off.

A1. The DC/DC converter according to A0, wherein magnetic coupling between the primary coil (L1) and the secondary coil (L2) is loose-coupling.

A2. The DC/DC converter according to A0 or A1, wherein each of the first rectification device (D1) and the second rectification device (D2) is a diode.

A3. The DC/DC converter according to any one of A0 to A2, wherein the primary coil (L1) and the secondary coil (L2) are spaced apart from each other and are wound around a core of the transformer (TR).

A4. The DC/DC converter according to any one of A0 to A3, wherein the transformer (TR) has a gap.

B0. A DC/DC converter that converts direct-current power between first and second input terminals (T1, T2) and first and second output terminals (T3, T4), the DC/DC converter comprising:

(a) a transformer (TR) including a primary coil (L1) that is connected at one end to the first input terminal (T1), a first secondary coil (L21) that is magnetically coupled to the primary coil (L1) and is connected at the other end to the second output terminal (T4), and a second secondary coil (L22) that is magnetically coupled to the primary coil (L1) and is connected at one end to the second output terminal (T4);

(b) a switching element (Q) that is turned on and off to make a current path between the other end of the primary coil (L1) and the second input terminal (T2) conductive or to cut off the current path, and includes a control terminal;

(c) a first rectification device (D1) that is connected between one end of the first secondary coil (L21) and the first output terminal (T3), is forward-biased with respect to a potential generated at the one end of the first secondary coil (L21) by mutual induction caused by self-induction of the primary coil (L1) when the switching element (Q) is on, and is reverse-biased when the switching element (Q) is off; and (d) a second rectification device (D2) that is connected between the other end of the second secondary coil (L22) and the first output terminal (T3), is reverse-biased with respect to a potential generated at the other end of the second secondary coil (L22) by mutual induction caused by self-induction of the primary coil (L1) when the switching element (Q) is on, and is forward-biased when the switching element (Q) is off.

B1. The DC/DC converter according to B0, wherein magnetic coupling between the primary coil (L1) and the first secondary coil (L21) is loose-coupling, and magnetic coupling between the primary coil (L1) and the second secondary coil (L22) is tight-coupling.

B2. The DC/DC converter according to B0 or B1, wherein each of the first rectification device (D1) and the second rectification device (D2) is a diode.

B3. The DC/DC converter according to any one of B0 to B2, wherein the primary coil (L1) and the first secondary coil (L21) are spaced apart from each other and are wound around a core of the transformer (TR), and the primary coil (L1) and the second secondary coil (L22) are wound around the core of the transformer (TR) in lap winding.

B4. The DC/DC converter according to any one of B0 to B3, wherein the transformer (TR) has a gap.

C0. Provided is a DC/DC converter that can output power during both an on-period and an off-period of a switching element. The DC/DC converter may include: a transformer TR including a primary coil L1 that is connected at one end to a first input terminal T1 and a secondary coil L2 that is magnetically coupled to the primary coil and is connected at the other end to the first input terminal; a switching element Q that is turned on and off to connect or cut off the primary coil and includes a control terminal; a first rectification device D1 that is connected between one end of the secondary coil and a first output terminal T3, makes a first current i1 on a path from the first input terminal to the first output terminal via the secondary coil to flow during an on-period, and cuts off the first current during an off-period; and a second rectification device D2 that is connected between the other end of the primary coil and the first output terminal, cuts off a second current on a path from the first input terminal to the first output terminal via the primary coil during the on-period, and makes the second current to flow during the off-period.

The invention claimed is:

1. A DC/DC converter that converts direct-current power between first and second input terminals and first and second output terminals, where the second input terminal and the second output terminal are common terminals, the DC/DC converter comprising:
(a) a transformer including a primary coil connected at a first end to the first input terminal, and a secondary coil magnetically coupled to the primary coil and connected at a first end to the first input terminal, wherein the primary coil and the secondary coil have opposing polarities;
(b) a single switching element disposed between a second end of the primary coil and the common terminal that is turned on and off to make a current path between the second end of the primary coil and the common terminals conductive or to cut off the current path, and includes a control terminal;
(c) a first rectification device that is connected between a second end of the secondary coil and the first output terminal; and
(d) a second rectification device that is connected between the second end of the primary coil and the first output terminal;
wherein the DC/DC converter is transitionable, using only the single switching element, between a first state, in which the first rectification device is forward-biased by the secondary coil and the second rectification device is reverse-biased by the primary coil, and a second state, in which the first rectification device is reverse-biased by the secondary coil, and the second rectification device is forward-biased by the primary coil.

2. The DC/DC converter according to claim 1, wherein magnetic coupling between the primary coil and the secondary coil is loose-coupling.

3. The DC/DC converter according to claim 1, wherein each of the first rectification device and the second rectification device is a diode.

4. The DC/DC converter according to claim 1, wherein the primary coil and the secondary coil are spaced apart from each other and are wound around a core of the transformer.

5. The DC/DC converter according to claim 1, wherein the transformer has a gap.

6. A DC/DC converter that converts direct-current power between first and second input terminals and first and second output terminals, the DC/DC converter comprising:
(a) a transformer including a primary coil connected at a first end to the first input terminal, a first secondary coil magnetically coupled to the primary coil and connected at a first end to the second output terminal, and a second secondary coil magnetically coupled to the primary coil and is connected at a first end to the second output terminal, wherein the primary coil and the second secondary coil have opposing polarities;
(b) a single switching element disposed between a second end of the primary coil and the second input terminal that is turned on and off to make a current path between the second end of the primary coil and the second input terminal conductive or to cut off the current path, and includes a control terminal;
(c) a first rectification device that is connected between a second end of the first secondary coil and the first output terminal; and
(d) a second rectification device that is connected between a second end of the second secondary coil and the first output terminal;
wherein the DC/DC converter is transitionable, using only the single switching element, between a first state, in which the first rectification device is forward-biased by the first secondary coil and the second rectification device is reversed-biased by the second secondary coil, and a second state, in which the first rectification device is reverse-biased by the first secondary coil, and the second rectification device is forward-biased by the second secondary coil.

7. The DC/DC converter according to claim 6, wherein magnetic coupling between the primary coil and the first secondary coil is loose-coupling, and magnetic coupling between the primary coil and the second secondary coil is tight-coupling.

8. The DC/DC converter according to claim 6, wherein each of the first rectification device and the second rectification device is a diode.

9. The DC/DC converter according to claim 6, wherein the primary coil and the first secondary coil are spaced apart from each other and are wound around a core of the transformer, and the primary coil and the second secondary coil are wound around the core of the transformer in lap winding.

10. The DC/DC converter according to claim 6, wherein the transformer has a gap.

* * * * *